United States Patent [19]

Graiver et al.

[11] Patent Number: 5,171,775
[45] Date of Patent: Dec. 15, 1992

[54] EXPANDING-CONTRACTING HYDROGEL COMPOSITE AND PROCESS FOR PREPARATION THEREOF

[75] Inventors: Daniel Graiver, Midland, Mich.; Sho-kyu Gen; Yoshito Ikada, both of Kyoto, Japan

[73] Assignees: Dow Corning Corporation, Midland, Mich.; Bio-Materials Universe Company, Kyoto, Japan

[21] Appl. No.: 316,611

[22] Filed: May 19, 1989

[51] Int. Cl.$^5$ ............................................. C08L 29/04
[52] U.S. Cl. ...................................... 524/503; 525/59; 525/60
[58] Field of Search ............... 524/503; 525/59, 60

[56] References Cited

U.S. PATENT DOCUMENTS

| 4,310,593 | 1/1982 | Gross | 526/318.4 |
|---|---|---|---|
| 4,4444,830 | 4/1984 | Erickson | 428/246 |
| 4,663,358 | 5/1987 | Hyon et al. | 521/64 |
| 4,888,364 | 12/1989 | Graiver et al. | 521/134 |

FOREIGN PATENT DOCUMENTS

| 206751 | 12/1983 | Japan . |
|---|---|---|
| 25873 | 2/1984 | Japan . |
| 177066 | 10/1985 | Japan . |
| 63-115063 | 5/1987 | Japan . |
| 115064 | 5/1987 | Japan . |
| 46231 | 2/1988 | Japan . |

OTHER PUBLICATIONS

Graiver et al, Polymer Science Preprints, Japan, The Society of Polymer Science, vol. 36, E171-173, Oct. 21-24 (1987) Nos. 5-10.

Primary Examiner—Joseph L. Schofer
Assistant Examiner—Jeffrey T. Smith
Attorney, Agent, or Firm—James E. Bittell

[57] ABSTRACT

A process is provided for the preparation of expanding-contracting hydrogel composites which process comprises the steps of adding solid particles of a polyelectrolyte to a polyvinyl alcohol solution and subjecting the mixture to a low temperature treatment to cause gelation of the polyvinyl alcohol with the polyelectrolyte dispersed as a heterogeneous phase (i.e. solid particles) within the polyvinyl alcohol gel. Hydrogel composites made by the process exhibit high strength and a capacity to expand and contract over a wide range with changes in environment.

4 Claims, 1 Drawing Sheet

EXPANDING-CONTRACTING HYDROGEL COMPOSITE AND PROCESS FOR PREPARATION THEREOF

The present invention relates to a expanding-contracting hydrogel composition and, more particularly, to a expanding-contracting hydrogel composition of polyvinyl alcohol, in which a large change in the volume is caused by absorption and release of water.

BACKGROUND OF THE INVENTION

It is known that polyvinyl alcohol, which is a typical water-soluble polymer, forms a hydrogel. In order to utilize the easy-handling and other characteristics of hydrogels of this type, various hydrogels of polyvinyl alcohol and processes for the preparation thereof have been proposed. However, applications of hydrogels of polyvinyl alcohol are limited because the mechanical strengths are generally insufficient. To solve this problem, it has been proposed to introduce a cross linked structure into hydrogels of polyvinyl alcohol. There is a great risk of losing the desirable characteristics of the polyvinyl alcohol hydrogel as a result of introducing cross linked structure. Also the cross linking process per se is complicated.

Under these circumstances, a process has been developed in which polyvinyl alcohol is subjected to a low-temperature treatment to promote crystallization and cause gelation. According to this technique, a pure polyvinyl alcohol hydrogel having improved mechanical strength can be obtained.

It is known that a polyvinyl alcohol hydrogel absorbs water and that the hydrogel has such properties that it expands and its volume increases when it absorbs water while it contracts upon loss of absorbed water. At present, the potential of utilizing such properties as changing volume and good compatibility with human bodies, to develop products that can be applied to various uses is being studied. For example, an artificial muscle utilizing the force accompanying the volume change and a micro-pump for gradually releasing medicine activated by contracting the hydrogel as water is lost are being studied.

SUMMARY OF THE INVENTION

Known polyvinyl alcohol hydrogels are deficient in that the extent of the volume change accompanying absorption or loss of water is relatively small and their strengths are not usually sufficient. It is a primary object of the present invention to provide a expanding-contracting polyvinyl alcohol hydrogel composition having high mechanical strength and large changes in the volume as water is absorbed and then lost. Another object of the present invention is to provide a process for easily and assuredly preparing a expanding-contracting hydrogel composition having excellent characteristics as described above.

The expanding-contracting hydrogel composition of the present invention is characterized in that a polyelectrolyte is incorporated and dispersed as a heterogeneous phase in a hydrogel of polyvinyl alcohol. The water absorptivity of the polyvinyl alcohol hydrogel is enhanced by the polyelectrolyte contained as a heterogeneous phase, with the result that larger changes in volume occur.

The process for preparation of a hydrogel composition according to the present invention is characterized in that it comprises the steps of dispersing a polyelectrolyte into a polyvinyl alcohol solution and subjecting the mixture to a low-temperature treatment to cause gelation of the polyvinyl alcohol. The expanding-contracting polyvinyl alcohol hydrogel prepared by this process has excellent properties as described above and is easily prepared with consistent results.

DETAILED DESCRIPTION OF THE INVENTION

Figure 1:
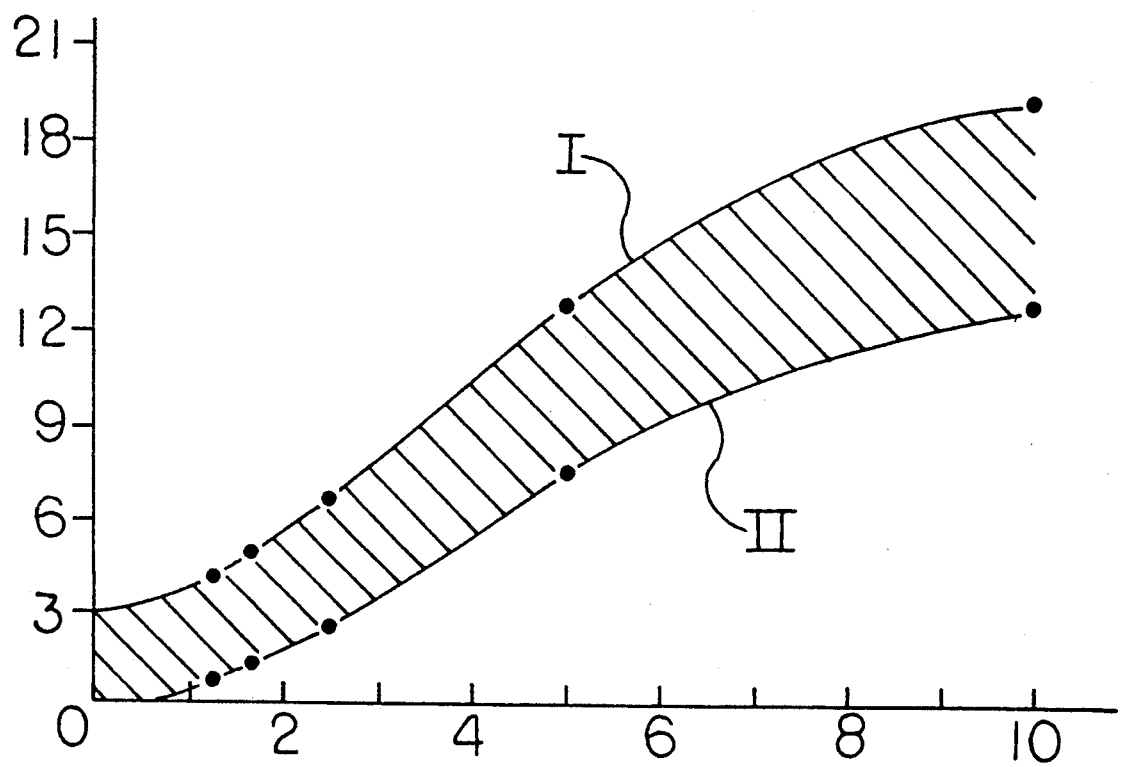
FIG. 1 shows curves obtained by plotting the volume ratios of the samples prepared in Example 1 of the present invention immersed in water (curve I) and the samples then immersed in acetone (curve II) against the concentration of sodium acrylate polymer. The concentration of sodium acrylate polymer is plotted on the x-axis (horizontal) as the grams of sodium acrylate polymer per 10 grams of polyvinyl alcohol. The volume ratios are plotted on the y-axis (vertical).

According to the present invention, a expanding-contracting hydrogel composition is prepared by uniformly incorporating and dispersing a polyelectrolyte as a heterogeneous phase in a hydrogel of polyvinyl alcohol. When the polyelectrolyte is described as a heterogeneous phase in the hydrogel, it is meant that the particles of polyelectrolyte retain their identity as distinct particles and are not dissolved in the hydrogel. According to one embodiment of the process for the preparation of this expanding-contracting hydrogel composition, a solution of polyvinyl alcohol is prepared and a polyelectrolyte is uniformly incorporated and dispersed in the solution in a heated state. The resulting mixture is cooled to a temperature lower than 0° C. to effect a low-temperature treatment, whereby crystallization of polyvinyl alcohol is promoted to cause gelation thereof. A expanding-contracting hydrogel composition comprising the polyelectrolyte uniformly dispersed as a heterogeneous phase in the hydrogel of polyvinyl alcohol is thus produced.

The kind of polyvinyl alcohol is not particularly critical, so that various polyvinyl alcohols can be used in the present invention. It is preferred that the degree of saponification of polyvinyl alcohol be at least 95 mole percent and the average degree of polymerization be at least 1000.

Water alone may be used as the solvent for obtaining the polyvinyl alcohol solution, but a mixed solvent comprising water and a water-miscible organic solvent is preferably used. Preferred mixed solvents have a high solvent action on polyvinyl alcohol but no or a very low solvent action on the polyelectrolyte so that the polyelectrolyte does not dissolve when it is dispersed into the polyvinyl alcohol solution. When such mixed solvents are used, it is easy to dissolve polyvinyl alcohol completely and dispersion of the polyelectrolyte, incorporated afterward, as a heterogeneous phase can be easily attained. As specific examples of the water-miscible organic solvent, there can be mentioned dimethyl sulfoxide, dimethylformamide, formaldehyde, acetaldehyde, ethylene oxide, methyl acetate, N-methylacetamide, dimethoxymethane, methyl ethyl ketone, 1,1-dimethoxyethane, phenol, aniline, 1,3-dimethyl-2-imidazolidinone, low-molecular-weight alcohols and the like.

The mixing ratio between water and the organic solvent in the mixed solvent is arbitrary, so long as polyvinyl alcohol can be completely dissolved in a heated state while the polyelectrolyte is not dissolved. The polyvinyl alcohol concentration of the polyvinyl alcohol solution is not particularly critical, but it can be adjusted according to the properties required of the hydrogel. The polyvinyl alcohol concentration is generally 1 to 30% by weight.

The polyelectrolyte may be uniformly dispersed in the polyvinyl alcohol solution in a heated state or at room temperature. Generally, it is preferred to add the polyelectrolyte in the form of a fine powder such as a powder having particle diameters in the range of about 0.1 to 100 micrometers. Powders with average particle diameters of from 1 to 50 micrometers are most preferred.

Any solid polyelectrolyte capable of being ionized and dissociated on contact with water can be used in the present invention. As specific examples of the polyelectrolyte, there can be mentioned polyacrylic acid, polymethacrylic acid, sodium, potassium and other metal salts of polyacrylic acid and polymethacrylic acid, polyethyleneimine, polymethacrylamide, partially hydrolyzed polyacrylamide, partially hydrolyzed polyalkylacrylamide, polyphosphoric acid, polyethylenesulfonic acid, polystyrenesulfonic acid, polyvinylamine, polyvinylsulfonic acid, polyvinylpyridines, poly-2-acrylamido-2-methylpropanesulfonic acid, copolymers of monomers having an ionizable atomic group such as copolymers of vinyl alcohol and acrylic acid, water-soluble derivatives of natural substances, and polymers thereof. These polyelectrolytes can be used singly or in the form of mixtures of two or more of them. A metal salt, especially a sodium salt, of polyacrylic acid is preferred.

In one preferred embodiment of the invention, a cross linked polyelectrolyte is dispersed in the polyvinyl alcohol gel. Cross linked polyelectrolytes which expand in water but do not dissolve in water are most preferred. Hydrogel containing such cross linked polyelectrolytes can be subjected to more expanding and contracting cycles without significant compositional changes or loss of polyelectrolyte in the water displaced from the hydrogel as it contracts. Linear polyelectrolytes which are more water soluble may gradually leach out of hydrogels as they contract or stand in excess water. Cross linked versions of any of the examples of polyelectrolytes described above can also be used in the hydrogel composites of the present invention. Alkali metal salts of cross linked polyacrylic acid and polymethacrylic acid are preferred.

In another preferred embodiment of the invention, a polyelectrolyte which is a block copolymer containing a polyvinyl alcohol block and a polyelectrolyte block is dispersed in the polyvinyl alcohol gel. Such block copolymer polyelectrolytes have a reduced tendency to diffuse out of the hydrogel composite during repeated expanding and contracting cycles because of the compatibility of the polyvinyl alcohol block with the matrix of the polyvinyl alcohol gel structure. In other words the polyvinyl alcohol block acts as an anchor to hold the polyelectrolyte within the hydrogel matrix. Hydrogel containing such block copolymer polyelectrolytes can be subjected to more expanding and contracting cycles without significant compositional changes or loss of polyelectrolyte in the water displaced from the hydrogel as it contracts. Block copolymers containing polyvinyl alcohol blocks and blocks of any of the polyelectrolytes described above can also be used in the hydrogel composites of this invention. Block copolymers of vinyl alcohol and acrylic acid and block copolymers of vinyl alcohol and methacrylic acid are preferred.

Although the polyelectrolyte to polyvinyl alcohol ratio is not particularly critical, it is preferable to use a ratio of at least 1/10 by weight. Ratios of at least ¼ by weight are still more preferred. As the proportion of the polyelectrolyte is increased, the expanding speed and expanding ratio of the hydrogel are increased. Accordingly, the proportion of the polyelectrolyte can be modified according to the desired expanding speed or expanding ratio.

The polyelectrolyte incorporated in the polyvinyl alcohol solution is uniformly dispersed in the polyvinyl alcohol solution. The resulting mixture is cooled to a temperature lower than 0° C. If necessary, heating and cooling cycles are repeated. By this low-temperature treatment, crystallization of the polyvinyl alcohol in the mixture is promoted to cause gelation, and a state where the polyelectrolyte is dispersed in the form of fine solid particles, that is, as the heterogeneous phase, in the formed hydrogel is produced. By the term "the heterogeneous phase" as used herein is meant a state where the polyelectrolyte is not dissolved in the hydrogel of polyvinyl alcohol but is present in the form of particles having a specific fine particle size. The presence of the polyelectrolyte as "the heterogeneous phase" can be recognized when the hydrogel is dried or is allowed to stand still in an organic solvent.

Since the expanding-contracting hydrogel composition of the present invention comprises the polyelectrolyte dispersed as a heterogeneous phase in the hydrogel of polyvinyl alcohol as described hereinbefore, the volume of the hydrogel changes greatly when the hydrogel is immersed in water and absorbs water, as compared with the volume in a state where water is not absorbed. Specifically, if the hydrogel composition in a dry state or a water-free state is brought into contact with water by immersion in water or the like, the hydrogel composition absorbs a large quantity of water. Because of the absorption of a very large quantity of water, the volume is increased greatly. Furthermore, the rate of volume change is very high. Conversely, if the hydrogel composition containing absorbed water is dried or immersed in a water-miscible organic solvent, the hydrogel composition releases water and contracts to a much smaller volume with a fast rate of volume change. As the water-miscible solvent, there can be mentioned, for example, alcohols such as methanol, ketones such as acetone, and glycols.

The speed and ratio of the volume change of the hydrogel composition of the present invention depend on the amount of incorporated polyelectrolyte, and an increase in the amount of polyelectrolyte results in an increase in the speed and ratio of the volume change. When the hydrogel composition is immersed in a mixture of water and an organic solvent, the hydrogel composition comes to have a volume corresponding to the concentration of water. Accordingly, by adjusting and changing the proportion of water in this mixture, the volume of the hydrogel composition can be increased or decreased in a controlled manner. Therefore, the volume of the hydrogel composition of the present invention can be controlled by controlling the proportion of the polyelectrolyte in the composition, the condition of the atmosphere with which the hydrogel composition is in contact and other factors. Thus, the volume change of the hydrogel composition can be controlled. Moreover, the hydrogel composition can be expanded and contracted repeatedly.

The reasons why the hydrogel composition of the present invention exerts the above-mentioned effects are considered to be as follows. When the hydrogel composition of the present invention is immersed in water, water is allowed to intrude into the interior of the hydrogel of polyvinyl alcohol because of the hydrophilicity and expandability of the hydrogel, and the polyelectrolyte dispersed as a heterogeneous phase is dissolved or expanded in water on contact therewith, with the result that sites having a high osmotic pressure are locally formed in the hydrogel, and a large quantity of water is further introduced into the hydrogel by this osmotic pressure, whereby the molecular chain of the polyelectrolyte is further expanded. If absorption and release of water are conducted according to this mechanism, it can be understood that the change in the volume of the hydrogel composition of the present invention by absorption and release of water is sufficiently reversible, though this reversibility is not perfect unless complete solution of the polyelectrolyte is avoided. Furthermore, it is possible that the volume of hydrogel composites of the present invention will change according to the physical and chemical conditions of the liquid in which the hydrogel composites are immersed, such as the intensity of the electric field, the pH value, the temperature and the concentration of additives.

The hydrogel composition of the present invention expands and contracts at a fast rate of volume change producing a large volume change ratio as pointed out hereinbefore and furthermore the hydrogel composites of the present invention have high mechanical strengths. One reason is that polyvinyl alcohol is caused to gel by a low-temperature treatment. In conventional non-cross linked polyvinyl alcohol hydrogels, the strength of the hydrogel depends generally on the polyvinyl alcohol concentration of the hydrogel. In contrast, the expanding-contracting gel of the present invention has very high mechanical strength even if the polyvinyl alcohol concentration is low. For example, a hydrogel of the present invention having a polyvinyl alcohol concentration of about 3 to about 5% by weight has a strength comparable to that of a known polyvinyl alcohol hydrogel having a polyvinyl alcohol concentration of 10% by weight. This is another characteristic feature of the expanding-contracting hydrogel composition of the present invention.

By utilizing the characteristic properties of large volume changes or forces generated by these volume changes, the expanding-contracting hydrogel composition can be used for mechanical and chemical instruments, electrochemical instruments and the like. More specifically, the hydrogel composite of the present invention is preferably used for an artificial muscle and a micro-pump for gradually releasing medicine. Since the expanding-contracting hydrogel of the present invention is composed of polyvinyl alcohol, compatibility with the human body is good. It is anticipated that hydrogel composites will be successfully used in fields where a high compatibility with the human body is required.

The present invention will now be described in detail with reference to the following examples that by no means limit the scope of the invention.

EXAMPLE 1

Polyvinyl alcohol having a degree of polymerization of 1700 and a degree of saponification of 99.5 mole % (supplied by Unitica) was dissolved in a dimethyl sulfoxide/water mixed solvent having a mixing weight ratio of 80/20 at 120°, and the solution was heated for 2 hours to completely dissolve the polyvinyl alcohol, whereby a transparent solution having a polyvinyl alcohol concentration of 10% by weight was obtained. While the solution was still hot, a sodium acrylate polymer (NP-1020 supplied by Sumitomo Chemical) was added at a ratio shown in Table 1 to the solution, and the mixture was cooled to room temperature with gentle stirring. The viscosity of the liquid increased with the drop in temperature. The resulting viscous solution was poured into a test tube having an appropriate size and allowed to stand at −5° C. for 24 hours and then at +5° C. for 3 days, whereby a expanding-contracting hydrogel composition having a sodium acrylate polymer concentration shown in Table 1 was prepared.

The expanding-contracting hydrogel composites contained fine particles of sodium acrylate polymer uniformly dispersed in a transparent matrix composed of polyvinyl alcohol, dimethyl sulfoxide and water.

The hydrogel composites were taken out of the test tube and cut into disks differing in size. In order to withdraw dimethyl sulfoxide, the cut hydrogel composites were immersed in a large quantity of methyl alcohol and used methyl alcohol was exchanged with fresh until no dimethyl sulfoxide was detected by gas chromatography. A reference sample was prepared in the same manner as that described above except that sodium acrylate polymer was not added.

With respect to each of the samples and reference sample, the radius, $d_o$, height, $h_o$, and volume, $V_o$, in an equilibrated state attained by leaving it stand in methyl alcohol and the radius, d, height, h, and volume, V, in an equilibrated state attained by leaving it to stand in water were measured. Furthermore, with respect to each sample, the solid content was determined. The results and the calculated values of the volume ratio V/Vo are shown in Table 1.

TABLE 1

| Sample No. | Na-PAA/ PVA (weight ratio) | Methyl Alcohol | | | Water | | | V/ Vo |
|---|---|---|---|---|---|---|---|---|
| | | $d_o$ | $h_o$ | $V_o$ | d | h | V | |
| 1 | 1/1 | 1.15 | 0.49 | 0.51 | 3.11 | 1.32 | 10.03 | 19.70 |
| 2 | 1/2 | 1.10 | 0.52 | 0.49 | 2.59 | 1.20 | 6.32 | 12.79 |
| 3 | 1/4 | 1.08 | 0.48 | 0.44 | 2.00 | 0.89 | 2.80 | 6.36 |
| 4 | 1/6 | 1.07 | 0.51 | 0.46 | 1.81 | 0.85 | 1.19 | 4.77 |
| 5 | 1/8 | 1.08 | 0.52 | 0.48 | 1.71 | 0.81 | 1.86 | 3.91 |
| 6 | 0 | 1.10 | 0.51 | 0.48 | 1.62 | 0.74 | 1.53 | 3.15 |

From the results shown in Table 1, it can be understood that the polyvinyl alcohol hydrogel composition of the present invention comprising a polyelectrolyte, such as sodium acrylate polymer, incorporated and dispersed therein is distinguished from a polyvinyl alcohol hydrogel not containing any polyelectrolyte in that there is an increased change in volume which corresponds to the content of polyelectrolyte. In the case of a hydrogel composition where the sodium acrylate polymer to polyvinyl alcohol ratio is 1/1, the volume in water is nearly 20 times the volume in methyl alcohol.

Furthermore, each of the above-mentioned samples was first immersed in water to bring it into an equilibrated state and then immersed in acetone to examine the volume ratio in an equilibrated state. In FIG. 1, the volume ratio of each sample in a state equilibrated in water was plotted against the concentration of sodium acrylate polymer to obtain curve I, and the volume ratio of each sample in a state equilibrated in acetone after the equilibration in water was plotted against the concentration of sodium acrylate polymer to obtain curve II. The hatched region between curves I and II is a region where the volume changed according to the proportion of water when the hydrogel was in contact with a water/acetone mixture, and it was confirmed that expanding and contracting occurred repeatedly in this region.

EXAMPLE 2

In the same manner as that described in Example 1, a transparent solution having a polyvinyl alcohol concentration of 2.85% by weight was prepared. Sodium acrylate polymer was added to the solution in a sodium acrylate polymer to polyvinyl alcohol ratio of 1/1, and the mixture was cooled to room temperature with gentle stirring. As the temperature was lowered, the viscosity of the liquid increased. The resulting viscous liquid was cast between flat glass sheets to form a film, and the film was allowed to stand at $-5°$ C. for 24 hours and the at $+5°$ C. for 3 days, whereby a film of a expanding-contracting hydrogel composite was prepared.

To remove dimethyl sulfoxide, the film was immersed in methyl alcohol, and the methyl alcohol repeatedly exchanged until no dimethyl sulfoxide was detected by gas chromatography.

The film of the hydrogel composition was cut into a dumbbell shape, and the cut film was immersed in acetone and dried in an atmosphere maintained at a temperature of 25° C. and a relative humidity of 65%. Then, the tensile test was carried out at a pulling speed of 20 mm/min under conditions not allowing release of water. The tensile strength and elongation of the film at break were measured. It was found that the tensile strength at break was 127 kPa and the elongation of the film was 100%.

From the foregoing results, it can be understood that the polyvinyl hydrogel composition of the present invention has sufficient mechanical strength.

EXAMPLE 3

This example illustrates the use of a cross linked polyelectrolyte for forming a composite with a hydrogel of polyvinyl alcohol. Hydrogel composites were prepared using a series of polyvinyl alcohols with molecular weights of 14,000, 86,000, and 115,000. Each polyvinyl alcohol sample had a degree of saponification of greater than 99.8 mole percent. The polyvinyl alcohol (6.94 g) was dissolved with stirring in a mixture of dimethyl sulfoxide (50 g) and water (12.5 g) at 110° C. The solution was maintained at 110° C. for an additional 0.5 h to insure complete dissolution of the polymer. The solution was allowed to cool whereupon its viscosity visibly increased.

A fine white powder (6.94 g, average diameter 25-30 micrometers, with a minimum assay of 92% polymer and maximum of 8% water) of partial sodium salt of cross linked polypropenoic acid (further identified as XUS 40346.00L Developmental Powder supplied by Dow Chemical U.S.A. Midland, Mich.) was stirred into the polyvinyl alcohol solution. After stirring into the polyvinyl alcohol solution, the small grains of polyelectrolyte remained dispersed and did not appear to settle to any significant extent. The viscous dispersion was poured into test tubes and petri dishes and placed in a freezer at $-22.5°$ C. overnight to gel. The gels were then moved to a refrigerator at 5° C. for six hours.

The gels were immersed in excess methanol to extract the dimethyl sulfoxide. The methanol was changed daily until no traces of dimethyl sulfoxide could be detected by GC of the methanol. Upon immersing the methanol-extracted gels in water, expanding was observed which resulted in a 3000% increase in volume of the gel after 24 hours.

EXAMPLE 4

This example illustrates the use of a polyelectrolyte that is a copolymer containing a polyvinyl alcohol block bonded to a polyelectrolyte block. Such copolymers have a reduced tendency to diffuse out of the hydrogel composite during repeated expanding and contracting cycles because of the compatibility of the polyvinyl alcohol block with the matrix of the polyvinyl alcohol gel structure. In other words the polyvinyl alcohol block acts as an anchor to hold the polyelectrolyte within the hydrogel matrix.

Hydrogel composites were prepared using the procedure of Example 3 except that a block copolymer of acrylic acid and vinyl alcohol was used as the polyelectrolyte to form the hydrogel composite. The block copolymer (further identified by the tradename Sumikagel® SP-510 obtained form Sumitomo Chemical Co. Ltd., Japan) was added to the polyvinyl alcohol solution in the form of a fine white powder (average diameter 10 micrometer, with a minimum assay of 89% polymer and maximum of 11% water). Upon immersing the methanol-extracted gels in water, expanding was observed which resulted in a 8000% increase in volume of the gel after about 30 hours.

That which is claimed is:

1. A swelling-shrinking hydrogel composition comprising particles of polyelectrolyte uniformly dispersed in a hydrogel of polyvinyl alcohol, the volume of which is increased by absorption of water, where the polyelectrolyte is selected from the group consisting of alkali metal salts of cross linked polyacrylic acid and alkali metal salts of cross linked polymethacrylic acid and wherein the weight ratio of the polyelectrolyte to the polyvinyl alcohol is at least 1/10.

2. A swelling-shrinking hydrogel composition as set forth in claim 1, wherein the particles have diameters in the range of about 0.1 to 100 micrometers.

3. A swelling-shrinking hydrogel composition as set forth in claim 2, wherein the polyelectrolyte is a cross linked polyelectrolyte which swells in water but does not dissolve in water at 25° C. and wherein the polyelectrolyte is selected from the group consisting of alkali metal salts of cross linked polyacrylic acid and alkali metal salts of cross linked polymethacrylic acid.

4. A swelling-shrinking hydrogel composition as set forth in claim 3, wherein the polyelectrolyte is an alkali metal salt of cross linked polyacrylic acid.

* * * * *